United States Patent

[11] 3,624,769

| [72] | Inventor | Quinten A. Hansen |
| | | Franksville, Wis. |
| [21] | Appl. No. | 30,042 |
| [22] | Filed | Apr. 20, 1970 |
| [45] | Patented | Nov. 30, 1971 |
| [73] | Assignee | Eaton, Yale & Towne Inc. |
| | | Cleveland, Ohio |

[54] PRESSURE VENTING CONTROL
12 Claims, 7 Drawing Figs.

[52] U.S. Cl. ................................ 192/85 AA,
91/442, 137/517, 137/525
[51] Int. Cl. ................................ F16d 25/063,
F16k 15/14
[50] Field of Search ........................... 192/85 AA,
85 A, 106 F; 91/268, 442; 137/517, 525

[56] References Cited

UNITED STATES PATENTS

| 3,301,142 | 1/1967 | Cenko | 192/106 F X |
| 178,253 | 6/1876 | Stacy et al. | 137/525 X |
| 530,442 | 12/1894 | Munger | 137/517 |
| 2,106,775 | 2/1938 | Trask | 137/517 X |
| 2,793,649 | 5/1957 | Hamer | 137/517 X |
| 2,948,296 | 8/1960 | Thorburn | 137/517 |
| 2,954,040 | 9/1960 | Bolster | 192/85 AA X |
| 3,338,360 | 8/1967 | Cornillaud | 192/85 |

FOREIGN PATENTS

| 941,334 | 4/1956 | Germany | 137/517 |

*Primary Examiner*—Allen D. Herrmann
*Attorney*—Wheeler, House & Wheeler

ABSTRACT: A ram to which fluid pressure is supplied for actuation of any desired article (exemplified both by a Reeves pulley rate changer and by a disk clutch) is automatically vented when fluid is no longer supplied, thereby allowing the actuated article promptly to resume its initial position. The vent controlling valve includes a centrally apertured resilient disk which normally assumes a position in which its central aperture is spaced from a seat which the central portion of the disk engages when under pressure. Vent ducts radially offset from the opening in the valve disk discharge fluid when the disk is not subject to substantial pressure. However, when the ram is actuated the differential pressure across the disk causes the disk to engage the seat, thus substantially terminating fluid discharge by closing either or both of the discharge ducts.

PATENTED NOV 30 1971 3,624,769
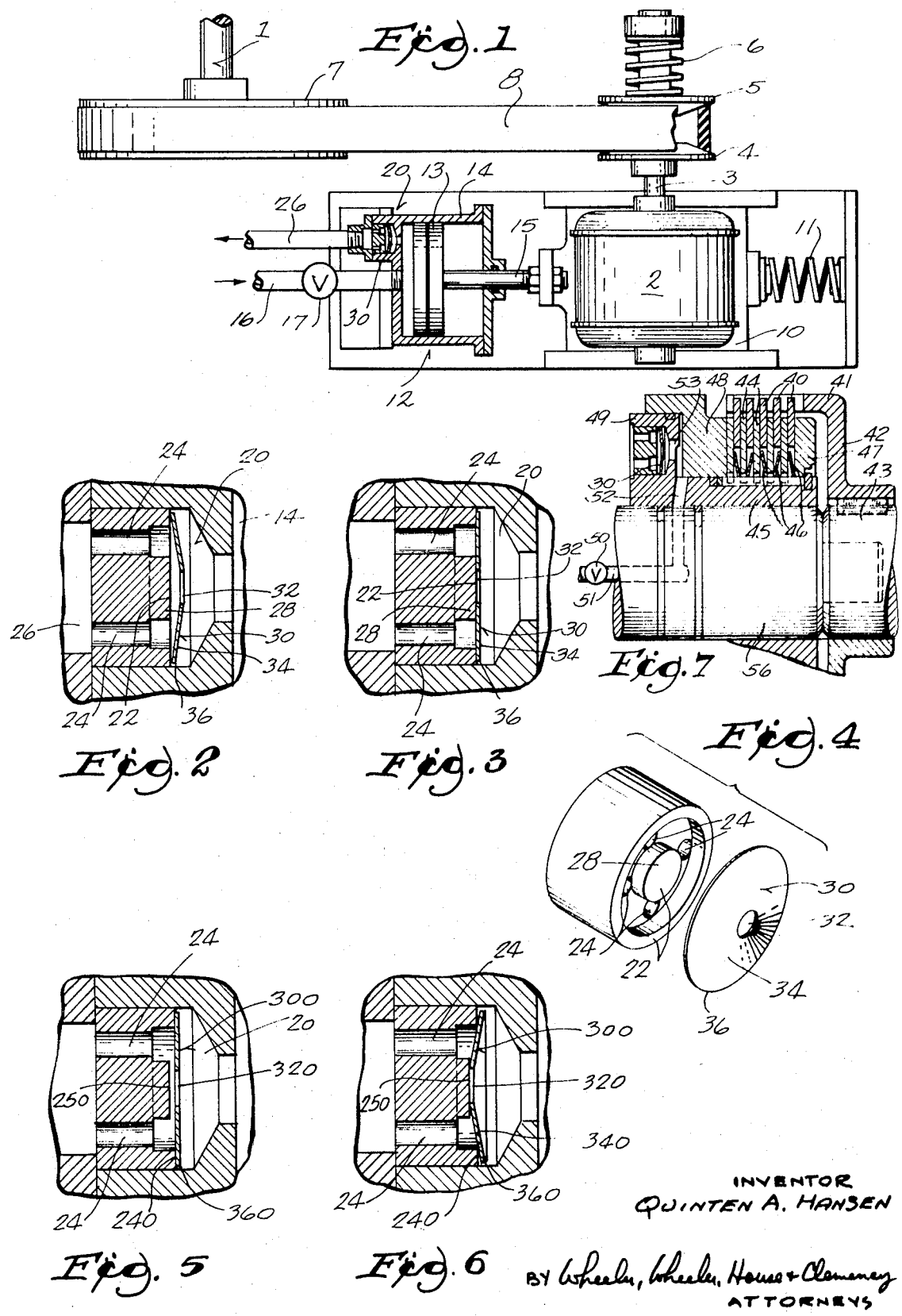
INVENTOR
QUINTEN A. HANSEN
BY Wheeler, Wheeler, House & Clemency
ATTORNEYS

PRESSURE VENTING CONTROL

BACKGROUND OF INVENTION

Fluid pressure rams normally require mechanically operated valving for pressure relief of the liquid or gaseous fluid. In the instant device some loss of pressure inevitably occurs as soon as the ram is disconnected from the pressure source. However, the ram would remain subject to pressure for some time but for the present invention, which expedites the discharge of the fluid and the return of the actuated mechanism to its initial position.

SUMMARY OF INVENTION

According to the present invention, any substantial drop or pressure in the ram is followed automatically by complete relief of the residual ram pressure so that the actuated mechanism returns to its original position without requiring the use of a three-way control valve or other mechanism which is either complex or manually operable. A bleed valve in the form of a resilient disk with a central port yields to engage its ported area with a fixed seat when there is substantial pressure differential across the valve. When the abrupt ram-operating pressure impulse which closes the valve has been at least partially relieved, the resilience of the disk causes the valve to open and to bleed off the residual pressure. As hereinafter disclosed, the valve may be initially dished or initially flat, the form of the cooperating seat being changed accordingly.

BRIEF DESCRIPTION OF DRAWINGS

FIG. 1 is a diagrammatic plan view of a hydraulically controlled rate changer, with parts broken away.

FIG. 2 is a greatly enlarged detail view in section of a control valve made in accordance with the present invention, the valve being shown open.

FIG. 3 is a view similar to FIG. 2 showing the valve in its closed position.

FIG. 4 is a view in perspective, showing in mutually separated positions the component parts of the relief valve structure.

FIG. 5 is a sectional view similar to FIG. 2 showing a modified embodiment of the invention, the vent valve being open.

FIG. 6 is a sectional view similar to FIG. 3 showing the valve of FIG. 5 in its closed position.

FIG. 7 is a fragmentary view partially in axial section showing the application of the relief valve to a fluid actuated clutch.

DETAILED DESCRIPTION

The speed changing mechanism diagrammatically illustrated in FIG. 1 represents a conventional way of variably controlling the rate at which the driven shaft 1 is actuated from the motor 2. The armature shaft 3 carries split pulley elements 4 and 5, the latter being yieldable axially of driving shaft 3 against the bias of compression spring 6. The pulley 7 on the driven shaft 1 is operated by a belt 8 trained over the pulley elements 4 and 5. When the driving shaft 3 is spaced more widely from shaft 1, the belt 8 forces its way down between the beveled sides of pulley sections 4 and 5 to a smaller radius, thereby changing the rate at which the driven shaft is operated by the motor. When the motor and driving shaft move toward the driven shaft 1, the radius at which belt 8 operates over the pulley sections 4 and 5 is increased, thus accelerating the driven shaft with respect to the armature shaft.

The motor is mounted on a slide 10 subject to the bias of compression spring 11 which urges the motor toward a position in which the belt operates over the split pulleys 4, 5 at maximum radius. A ram 12 comprises means for moving the motor against the bias of spring 11 to change the drive ratio. The ram includes a piston 13 operating in cylinder 14 and connected with slide 10 be rod 15 to actuate the slide to reduce the radius at which the belt 8 operates over the split pulleys 4, 5. The ram receives operating fluid under pressure from the pressure pipe 16 subject to valve 17. An object of the present invention is to provide a ported bleed valve which closes when subjected to increased pressure across its port but is normally open for the automatic gradual relief of residual ram pressure so that the parts will tend to revert to their original position under the bias of spring 11 without requiring separate manipulation of a valve for this purpose.

A valve chamber 20 communicating with the interior of the ram cylinder 14 behind the piston 13 or other movable wall is provided with a seat 22 through which one or more relief ducts 24 lead to a fluid return or discharge pipe 26. In the device shown in FIGS. 2 and 3, the seat 22 is a generally planiform surface having a central closure portion 28 from which the ducts 24 are radially offset. The relief valve 30 comprises a very slightly dished resilient disk having a central relief port 32 and having its outer periphery 36 engaged with seat 22. When relieved of substantial pressure, the disk 30 springs to the open position shown in FIG. 2 wherein the port 32 is spaced from the closure surface 23 at the center of seat 22 and thus provides passage across the seat to the vent ducts 24.

When the chamber 20 is subject to substantial pressure, as when valve 17 is opened to admit pressure to the ram, pressure differential across the port 32 causes the disk 30 to be flattened upon the seat 22, whereby its margins 34 around the relief port 32 engage the fixed surface 22, thereby shutting port 32. At the same time, the imperforate portions 34 of the disk 30 completely close the ducts 24 as shown in FIG. 4.

The amount of pressure differential which will result in the opening of the relief valve with desired expedition is readily determinable by selecting spring stock of appropriate characteristics. It will be apparent from the foregoing description that if the spring disk valve 30 is relatively stiff it will open almost immediately when relieved of pressure upon the closing of valve 8. If lighter and more resilient stock is used, there may be substantial delay before the relief valve opens to permit the ram and the actuated part to return to their initial positions.

In the modified embodiment of FIGS. 5 and 6, the resilient plate 300 is not dished but is normally flat as shown in FIG. 5. Its relief port 320 is thus normally spaced from the central fixed closure surface 250, which is offset slightly from the plane of the outer periphery 360 of plate 300, this being engaged with seat 240.

Either of the valve embodiments previously disclosed can be used to control a fluid clutch such as that shown in FIG. 7. The disk pack includes disks 40 keyed to the sleeve portion 41 of a carrier 42 splined to the driven shaft 43. Disks 44 of smaller radius are keyed to hub 45 of the driving shaft 56. Belville springs 46 tend to spread the disks apart and thereby to maintain the clutch normally disengaged.

The disk pack is confined between the ring 47 and the ram cylinder 48. The ram cylinder is reciprocable and has a packed bearing on a piston 49 fixed to the drive shaft 56. The opening of valve 50 on the fluid pressure line 51 admits pressure through the duct 52 into the chamber 53 between the axially movable cylinder member 48 and the piston 49, thereby subjecting the disk pack to pressure for engaging the clutch.

After the valve 50 is closed, the pressure in the system will be somewhat relaxed but would tend to cause the clutch to drag but for the relief afforded by the opening of valve disk 30, which functions as described in connection with the discussion of FIG. 2.

While the clutch is energized by pressure admitted through valve 50, the disk 30 will flatten against the seat as shown in FIG. 3. When the pressure valve has closed and pressure in chamber 53 is relaxed, the disk 30 will spring out as shown in FIG. 2 thereby draining off pressure from the ram and permitting disks of the pack to be forced apart by the belville springs, thus completely disengaging the clutch.

I claim:

1. A fluid pressure actuated clutch comprising a disk pack and means for maintaining the disks normally separated for the disengagement of the clutch, a fluid pressure ram for engaging the disks and including a pressure chamber, and means comprising a resiliently dished valve for venting said chamber upon partial relief of pressure therein.

2. A combination according to claim 1 in further combination with valve control means for admitting fluid under pressure to said chamber, said chamber having a seat against which said resilient dished valve engages when said chamber is subjected to pressure, said valve and seat having separable portions between which fluid in said chamber is vented to relieve ram pressure on said disks when the resilience of said valve effects separation of said separable portions.

3. In combination, a pressure chamber, means for venting said chamber, a resilient spring steel disk valve controlling said venting means, means for supplying pressure fluid to said chamber, said disk provided with a centrally located port through which said vented pressure fluid flows, and a seat against which the marginal portion about said portion of said disk engages for shutting the valve-controlled venting means when admission of pressure fluid to said chamber establishes a pressure differential across said disk valve sufficient to deform said disk valve from its normally venting position.

4. A combination according to claim 3 in which the disk valve controlling said venting means is self-opening at a variable rate to relieve pressure in said chamber when supply of pressure fluid to the chamber is terminated, said variable rate determined by the spring characteristic of said spring steel disk valve.

5. A combination according to claim 4 in which said chamber has a movable wall portion operatively engaged with an actuated device and subject to biasing means to which the pressure of said fluid is opposed, said wall portion and device being operable in one direction when pressure fluid is supplied to said chamber and operable in the opposite direction by said biasing means when said valve-controlled venting means opens.

6. A combination according to claim 3 in which the valve controlling said venting means includes a port, said valve disk including marginal portions about said port which are engageable with said seat to interrupt flow through said port.

7. A combination according to claim 6 in which the said disk is normally dished.

8. A combination according to claim 6 in which the seat is of sufficient diameter to be engaged by disk portions beyond the port when said disk is subject to pressure, said last disk portions further releasably closing at least one duct constituting said venting means.

9. A combination according to claim 3 in which said chamber has a wall which is centrally impervious and provides said seat, said wall being provided with at least one duct radially offset from said seat and which normally communicates with said chamber through a central port with which the valve disk is provided, the disk having marginal portions about said port which engage said seat when the valve is subject to sufficient pressure differential across said port to cause the valve to flex in opposition to its resilient bias.

10. A combination according to claim 9 in which the valve disk is normally convex and has portions spaced outwardly from said port which are normally engaged with said seat radially outside of the said duct.

11. A combination according to claim 9 in which the portion of said wall which provides the seat is axially offset from the portion of said wall with which peripheral portions of said disk are normally engaged.

12. In combination, a pressure chamber, means for venting said chamber, a flat resilient disk valve controlling said venting means, means for supplying fluid pressure to said chamber, said chamber having a centrally impervious wall providing a seat against which a portion of said disk valve engages for shutting the valve-controlled venting means when admission of pressure fluid to said chamber establishes a pressure differential across said valve, said wall being provided with at least one duct radially offset from said seat and which normally communicates with said chamber through a central port with which the valve disk is provided, the disk having marginal portions about said port which engage said seat when the valve disk is subject to sufficient pressure differential across said port to cause the disk to flex in opposition to its resilient bias, the portion of said seat opposite the port in said disk being axially offset from the portion of said seat engaged by portions of the disk radially remote from said control port.

* * * * *